(12) United States Patent
Chen et al.

(10) Patent No.: US 9,143,434 B2
(45) Date of Patent: Sep. 22, 2015

(54) MULTI-PROTOCOL LABEL SWITCHING MULTI-TOPOLOGY SUPPORT

(75) Inventors: Huaimo Chen, Bolton, MA (US); Qianglin Quintin Zhao, Boxborough, MA (US); Raveendra Torvi, Nashua, NH (US); Hua Autumn Liu, Boxborough, MA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/523,564

(22) Filed: Jun. 14, 2012

(65) Prior Publication Data

US 2012/0250583 A1    Oct. 4, 2012

Related U.S. Application Data

(63) Continuation of application No. 12/414,331, filed on Mar. 30, 2009, now Pat. No. 8,223,669.

(60) Provisional application No. 61/043,043, filed on Apr. 7, 2008.

(51) Int. Cl.
*H04L 12/26* (2006.01)
*H04L 12/56* (2006.01)
(Continued)

(52) U.S. Cl.
CPC ........... *H04L 45/12* (2013.01); *H04L 45/00* (2013.01); *H04L 45/02* (2013.01); *H04L 45/50* (2013.01)

(58) Field of Classification Search
CPC ......... H04L 45/00; H04L 45/02; H04L 45/04; H04L 45/50; H04L 45/52; H04L 45/74; H04L 45/745

USPC .................................................. 370/254, 392
See application file for complete search history.

(56) References Cited

U.S. PATENT DOCUMENTS 7,095,738 B1    8/2006  Desanti
8,111,702 B1 *  2/2012  Wijnands et al. ............. 370/400
(Continued)

FOREIGN PATENT DOCUMENTS

CN     101014008 A    8/2007
WO   2006133669 A1   12/2006
(Continued)

OTHER PUBLICATIONS

Mirtorabi et al., "Extensions to OSPFv2 for Advertising Optional Route/Link Attributes", Jul. 11, 2005, Network Working Group Internet-Draft.*

(Continued)

*Primary Examiner* — Hoang-Chuong Vu
(74) *Attorney, Agent, or Firm* — Conley Rose, P.C.; Grant Rodolph; Brandt D. Howell

(57) ABSTRACT

A network component comprising at least one processor configured to implement a method comprising receiving a packet, determining whether the packet comprises a topology label, and adding the topology label to the packet if the packet does not comprise the topology label. Included is a method comprising routing a plurality of packets corresponding to a plurality of forwarding equivalence classes (FECs) over a plurality of network topologies using a topology label and plurality of forwarding labels for each network topology. Also included is a network comprising a plurality of nodes in communication with each other and having a plurality of network topologies, wherein at least some of the nodes are configured to route data packets for a plurality of FECs along a path in each network topology using a topology label corresponding to each network topology and an inner label corresponding to each FEC.

19 Claims, 12 Drawing Sheets

(51) Int. Cl.
*H04L 12/721* (2013.01)
*H04L 12/701* (2013.01)
*H04L 12/751* (2013.01)
*H04L 12/723* (2013.01)

(56) References Cited

U.S. PATENT DOCUMENTS

| | | | |
|---|---|---|---|
| 8,724,637 B2 * | 5/2014 | Liu et al. | 370/395.5 |
| 2001/0033574 A1 * | 10/2001 | Enoki et al. | 370/396 |
| 2004/0037296 A1 | 2/2004 | Kim et al. | |
| 2005/0165834 A1 | 7/2005 | Nadeau et al. | |
| 2007/0030846 A1 | 2/2007 | Szczesniak et al. | |
| 2007/0030852 A1 | 2/2007 | Szczesniak et al. | |
| 2007/0047463 A1 * | 3/2007 | Jarvis et al. | 370/254 |
| 2007/0127474 A1 | 6/2007 | Mirtorabi et al. | |
| 2007/0214275 A1 * | 9/2007 | Mirtorabi et al. | 709/230 |
| 2007/0217420 A1 | 9/2007 | Raj et al. | |
| 2008/0186978 A1 * | 8/2008 | Geib | 370/395.31 |
| 2009/0016458 A1 | 1/2009 | Asati et al. | |
| 2009/0028162 A1 | 1/2009 | Hu | |
| 2009/0097406 A1 * | 4/2009 | Nilakantan et al. | 370/235 |
| 2009/0175194 A1 | 7/2009 | Akhter et al. | |
| 2010/0046526 A1 | 2/2010 | Kompella | |

FOREIGN PATENT DOCUMENTS

| WO | WO 2006133669 A1 * | 12/2006 |
|---|---|---|
| WO | 2007019310 A2 | 2/2007 |
| WO | 2008114007 A1 | 9/2008 |

OTHER PUBLICATIONS

Przygienda et al. M-ISIS: Multi Topology (MT) Routing in ISIS, Nov. 5, 2007—Internet Draft.*
L. Andersson et al., "LDP Specification", Jan. 2001, Network Working Group—Request for Comments: 3036.*
Bob Thomas et al., "LDP Capabilities", Mar. 2007, Network Working Group—Internet Draft.*
Andersson, L., et al., "LDP Specification," Network Working Group, RFC 3036, Jan. 2001, 124 pages.
Bradner, S., "Key Words for Use in RFCs to Indicate Requirement Levels," Network Working Group, RFC 2119, Mar. 1997, 3 pages.
Narten, T., "Assigning Experimental and Testing Numbers Considered Useful," Network Working Group, RFC 3692, Jan. 2004, 8 pages.
Narten, T., et al., "Guidelines for Writing an IANA Considerations Section in RFCs," Network Working Group, RFC 2434, Oct. 1998, 11 pages.
Przygienda, T., et al., "M-ISIS: Multi Topology (MT) Routing in Intermediate System to Intermediate Systems (IS-ISs)," Network Working Group, RFC 5120, Feb. 2008, 14 pages.
Psenak, P., et al., "Multi-Topology (MT) Routing in OSPF," Network Working Group, RFC 4915, Jun. 2007, 21 pages.
Rosen, E., et al, "Multiprotocol Label Switching Architecture," Network Working Group, RFC 3031, Jan. 2001, 57 pages.
Huawei, "M-LDP: Multi Topology (MT) Signalling Using LDP in MPLS," Internet Draft, draft-huawei-MT-LDP-00.txt, Nov. 12, 2008, 11 pages.
Przygienda, Tony, et al., "M-ISIS: Multi Topology (MT) Routing in IS-IS," Internet Draft, draft-ietf-isis-wg-multit-opology-12.txt, Nov. 5, 2007, 27 pages.
Thomas, Bob, et al., "LDP Capabilities," Network Working Group, Internet Draft, draft-thomas-mpls-ldp-capabilities-02.txt, Mar. 2007, 13 pages.
Zhao,Q., et al., "LDP Extension for Multi Topology Support," draft-zhao-mpls-ldp-multi-topology-02.txt, Jul. 8, 2011, 22 pages.
Foreign Communication From a Related Counterpart Application—International Search Report and Written Opinion, PCT/CN2009/071184, Jul. 16, 2009, 10 pages.
Andersson, L., Ed., et al., "LDP Specification," RFC 5036, Oct. 2007, 135 pages.
Kompella, K., et al., "Detecting Multi-Protocol Label Switched (MPLS) Data Plane Failures," RFC 4379, Feb. 2006, 50 pages.

* cited by examiner

MULTI-PROTOCOL LABEL SWITCHING MULTI-TOPOLOGY SUPPORT

CROSS-REFERENCE TO RELATED APPLICATIONS

The present application is a continuation of U.S. patent application Ser. No. 12/414,331 filed Mar. 30, 2009 by Huaimo Chen, et al. and entitled "Multi-Protocol Label Switching Multi-Topology Support," which claims priority to U.S. Provisional Patent Application No. 61/043,043 filed Apr. 7, 2008 by Hua Autumn Liu et al. and entitled "System and Method for Multi-Protocol Label Switching Multi-Topology Support," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In packet based networks, data packets are transported using a plurality of network routers. A router can receive a packet, analyze the packet's content, and forward the packet to the next hop or router using a routing algorithm based on the packet's content. For instance, in Multiprotocol Label Switching (MPLS) networks, the router can assign a plurality of Forwarding Equivalence Classes (FECs) to a plurality of packet types and associate each FEC with one next hop. As such, all packets that belong to a specific FEC are forwarded to the same next hop and hence can follow the same path or route in the network. The FECs can be assigned to the packet types once, for instance at the ingress node or first router in the network. The FEC can then be encoded as a short fixed length value known as a "label" and added to the packet. At each router, the received label can be associated with the next hop and a second label, for instance using a mapping table. Accordingly, when the router receives a packet, the router can match the label in the packet with one entry in the mapping table and replace the label with the second label before forwarding the packet to the next hop.

Further, some routing protocols, such as Open Shortest Path First (OSPF) and Intermediate System to Intermediate System (IS-IS), can currently support Multi-Topology (MT) routing. Using MT routing, the packets corresponding to different network topologies, which comprise nodes and links that communicate based on different architectures and/or signaling mechanisms, can be routed separately in the network. Additionally, different level of services can be assigned to different network topologies, such as level of security or quality of service (QoS), which simplifies network management and/or operations. However, MT routing is not currently supported in MPLS networks.

SUMMARY

In one embodiment, the disclosure includes a network component comprising at least one processor configured to implement a method comprising receiving a packet, determining whether the packet comprises a topology label, and adding the topology label to the packet if the packet does not comprise the topology label.

In another embodiment, the disclosure includes a method comprising routing a plurality of packets corresponding to a plurality of FECs over a plurality of network topologies using a topology label and plurality of forwarding labels for each network topology.

In yet another embodiment, the disclosure includes a network comprising a plurality of nodes in communication with each other and having a plurality of network topologies, wherein at least some of the nodes are configured to route data packets for a plurality of FECs along a path in each network topology using a topology label corresponding to each network topology and an inner label corresponding to each FEC.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for providing MT routing for MPLS networks. Accordingly, a plurality of routers or nodes, including an ingress node, a transit node, and an egress node, may maintain and exchange topology and label information to route different network topology traffic in the MPLS network. The ingress node may assign a topology label to each network topology and maintain a topology-to-label mapping table, which may also be exchanged with or maintained by the transit node and egress node. For each network topology, the ingress node may assign a next hop label to each FEC and maintain a FEC-to-next-hop-label-forwarding-entry (FEC-to-NHLFE) mapping table. The ingress node may add a next hop label or inner label and then a topology label to the packet before forwarding the packet. The transit node may receive the packet and use the topology-to-label mapping table to determine the network topology based on the topology label in the packet. For each network topology, the transit node may assign a next hop label to each received inner label or FEC and maintain an incoming label mapping table. The transit node may then replace the received inner label with one next hop label as a new inner label from the incoming label mapping table corresponding to the topology and forward the packet. Similarly, the egress node may receive the packet and determine the network topology based on the topology label and the FEC based on the received inner label. The egress node may then remove the topology label, inner label, or both and pass the packet to the corresponding service and/or application in the network topology.

Figures 1, 2:
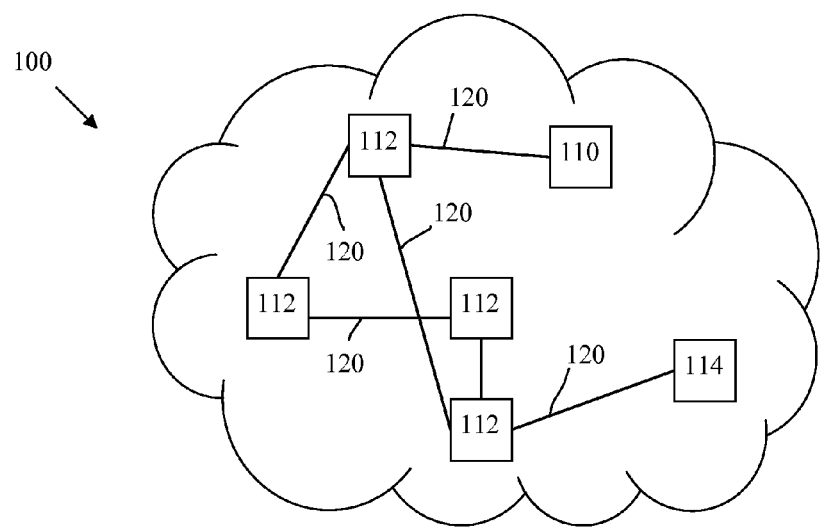
FIG. 1 is a schematic diagram of an embodiment of a packet switched network.
FIG. 2 is an illustration of an embodiment of a topology-to-label mapping table.

FIG. 1 illustrates one embodiment of a packet switched network 100 where data traffic may be transported using packets and routed based on packet labels. For instance, the label packet switched network 100 may be a packet switched network, where data traffic may be transported using packets or frames along network paths or routes. The packets may be routed or switched along the paths established by a label switching protocol, such as MPLS or generalized MPLS (GMPLS). Accordingly, the packets may be routed at a hop-to-hop basis, where each hop may determine the next hop to forward the packet to. The packets correspond to a plurality of network topologies in the packet switched network 100. Each network topology may be characterized or defined by an arrangement of network components or network architecture, by means of communications or signaling protocols between the network components, or both. Each network topology may be assigned different quality of service (QoS), security restrictions, allocated bandwidth, IP addressing scheme, etc. Further, a plurality of packet types may be transported at each network topology, which may be associated with corresponding FECs.

The packet switched network 100 may comprise an ingress node 110, at least one transit node 112, and an egress node 114, which may be coupled to one another using optical, electrical, or wireless links 120. In other embodiments, the packet switched network 100 may also comprise a plurality of ingress nodes 110 and egress nodes 114. The ingress node 110, transit node 112, and egress node 114, may be any device, component, or network that may produce, receive, and/or transport data packets. For example, the ingress node 110, transit node 112, and egress node 114 may include bridges, switches, routers, or various combinations of such devices. The ingress node 110, transit node 112, and egress node 114 may each comprise a plurality of ingress ports for receiving packets from other nodes, logic circuitry to determine which node to forward the packets to, and a plurality of egress ports for transmitting packets to other nodes.

In an embodiment, the transit nodes 112 may be a label switched routers (LSRs), which may be configured to modify the labels in the transported packets. The ingress node 110 and egress node 114 may be label edge routers (LERs), for example at the edges of the packet switched network 100, which may be configured to insert or remove the labels in the packets transported between the packet switched network 100 and external networks. The ingress node 110 and egress node 114 may be the source node and the destination node, respectively, in the packet switched network 100 along a label switched path (LSP), which may include some of the transit nodes 112.

In an embodiment, the ingress node 110 may receive a packet corresponding to one of the network topologies and tag the packet to indicate its network topology. Specifically, the ingress node 110 may assign a topology label for each network topology, which may be stored in a topology-to-label mapping table at the ingress node 110. Alternatively, the topology-to-label mapping table may be stored at another network component, which may be coupled to the ingress node 110, such as another node or server. To indicate the network topology of the packet, the ingress node 110 may add to the packet the topology label in the topology-to-label mapping table that corresponds to the network topology.

Additionally, the ingress node 110 may assign a next hop label for routing each FEC associated with each packet type, which may be stored in a FEC-to-NHLFE mapping table for each network topology at the ingress node 110 or may be accessible to the ingress node 110. As such, the quantity of stored FEC-to-NHLFE mapping tables may be equal to the quantity of network topologies in the packet switched network 100. The ingress node 110 may also add to the packet the next hop label in the FEC-to-NHLFE mapping table that corresponds to the packet FEC and network topology. The next hop label may be used to indicate the next hop to forward the packet to along the path. For instance, each next hop label may be assigned to or associated with one transit node 112, which may be determined based on some routing algorithm or protocol.

Accordingly, after processing the packet at the ingress node 110, the packet may comprise the topology label that indicates the network topology for the packet and the next hop label that indicates the next hop and FEC of the packet for that topology. In an embodiment, the topology label may be a top label added at the top of the packet and the next hop label may be an inner label added below the topology label, such that the topology label may be detected first at the next hop. The ingress node 110 may then forward the packet to the next hop, e.g., the transit node 112.

In an embodiment, the transit node 112 may receive the packet from the ingress node 110 or from another transit node 112. To determine the network topology of the packet, the transit node 112 may detect the topology label of the packet. The transit node 112 may obtain the set of topology labels in the packet switched network 100, for instance from the topology-to-label mapping table at the ingress node 110 or from a copy of the topology-to-label mapping table, which may be maintained at the transit node 112. The transit node 112 may match the received topology label with an entry in the topology-to-label mapping table to obtain the associated network topology.

Additionally, the transit node 112 may assign a next hop label for each received inner label. The next hop label may indicate the next hop to forward the packet to along the path, such as a next transit node 112 or egress node 114, which may be determined using the routing algorithm or protocol. This information may be stored in an incoming label mapping table for each network topology at the transit node 112 or may be accessible to the transit node 112. As such, the quantity of stored incoming label mapping tables may be equal to the quantity of network topologies in the packet switched network 100. Since the received inner label corresponds to a packet FEC or type, the transit node 112 may determine the packet FEC based on the received inner label, for instance by accessing the FEC-to-NHLFE mapping table for that topology at the ingress node 110 or obtaining the FEC mapping information from the previous hop. After determining the network topology and the packet FEC, the transit node 112 may replace the inner label in the received packet with the corresponding next hop label in the incoming label mapping table that corresponds to the packet FEC and network topology.

Accordingly, after processing the packet at the transit node 112, the packet may comprise the same top label or topology label that indicates the network topology and a new inner label that indicates the next hop and FEC of the packet for that topology. The transit node 112 may then forward the packet to the next hop, e.g., the next transit node 112 or the egress node 114.

In an embodiment, the egress node 114 may receive the packet from the transit node 112 or the ingress node 110 and determine the network topology of the packet based on the packet's top label. The egress node 114 may obtain the set of topology labels in the packet switched network 100 from the topology-to-label mapping table at the ingress node 110 or from a copy of the topology-to-label mapping table, which may be maintained at the egress node 114.

Additionally, the egress node 114 may determine the packet FEC or type based on the received inner label, for instance by obtaining the FEC mapping information from the previous hop. After determining the network topology and the packet FEC, the egress node 114 may remove the inner label, the top label, or both from the packet. The egress node 114 may then pass the packet to the corresponding service and/or application for the packet type in the network topology.

In an embodiment, the ingress node 110, the transit node 112, and the egress node 114 may negotiate their corresponding capabilities to support MT for MPLS in the packet switched network 100. For instance, if the ingress node 110, the transit node 112, or egress node 114 supports MT, it may send a message to at least one adjacent or neighboring node to inform the node of this capability. In some embodiments, the ingress node 110, the transit node 112, or egress node 114 supports MT, and may advertise this capability to all the other nodes in the packet switched network 100. For example, the message may comprise a bit, which may be set to indicate that the ingress node 110, the transit node 112, or egress node 114 supports MT in the MPLS network or may be cleared to indicate that it does not support MT in the MPLS network. Further, the ingress node 110, the transit node 112, or egress node 114 may forward its MT capability related information or exchange similar information with another node that also supports MT, for example after initially indicating their MT support capability.

In an embodiment, the ingress node 110, the transit node 112, or egress node 114 may forward or exchange the network topology mapping information with at least some of the remaining nodes, for example after negotiating their MT support capabilities. In some cases, the information may be forwarded or exchanged based on a request from another node. Accordingly, the ingress node 110, the transit node 112, or egress node 114 may forward the stored topology-to-label mapping table or the entries in the table to the neighboring node. For instance, the ingress node 110, the transit node 112, or egress node 114 may send a message or an object in the message, which may comprise such mapping information. The message or object may be sent with the forwarded packet from one hop to the next hop along the path. When the node receives the network topology mapping information, the node may maintain or update a mapping table comprising such information.

In an embodiment, the ingress node 110, the transit node 112, or egress node 114 may forward or exchange the FEC mapping information for each network topology with at least some of the remaining nodes, for example after forwarding or exchanging their network topology mapping information. The information may also be forwarded or exchanged based on a request from another node. Accordingly, the ingress node 110, the transit node 112, or egress node 114 may forward to the neighboring node the stored FEC-to-NHLFE mapping table, the incoming label mapping table, or the entries in such tables for each network topology. For instance, the ingress node 110, the transit node 112, or egress node 114 may send a message or an object in the message, which may comprise such mapping information. The message or object may be sent with the forwarded packet from one hop to the next hop along the path. When the node receives the FEC mapping information, the node may maintain or update a mapping table comprising such information.

In an embodiment, when a new ingress node 110, transit node 112, or egress node 114 joins a network topology in the packet switched network 100, it may advertise to the neighboring nodes or remaining nodes in the network topology its FEC mapping information for the network topology. The other nodes may receive such information, compare the information with their local information, and update accordingly the new node's information. The other nodes may also forward such information to other neighboring nodes. Further, when an ingress node 110, transit node 112, or egress node 114 leaves the network topology, it may advertise to the neighboring nodes or remaining nodes in the network topology that it withdraws its previously advertised FEC mapping information for the network topology, for example by sending a withdrawal message to the other nodes. The other nodes may receive the withdrawal message and update their local information accordingly. The other nodes may also forward the withdrawal message to other neighboring nodes.

FIG. 2 illustrates an embodiment of a topology-to-label mapping table 200 that may comprise the network topologies and the assigned label. Specifically, the topology-to-label mapping table 200 may comprise a topology label column 210 and a network topology column 220. The topology label column 210 may list the assigned labels corresponding to the network topologies. In an embodiment, the label assigned to each network topology may be a unique MT-Identifier (MT-ID), which may be different for each network topology. The network topology column 220 may list the network topologies in a packet based network or MPLS network. Thus, the rows within the topology-to-label mapping table 200 may indicate the assigned topology label associated with each network topology in the network.

Figure 3:
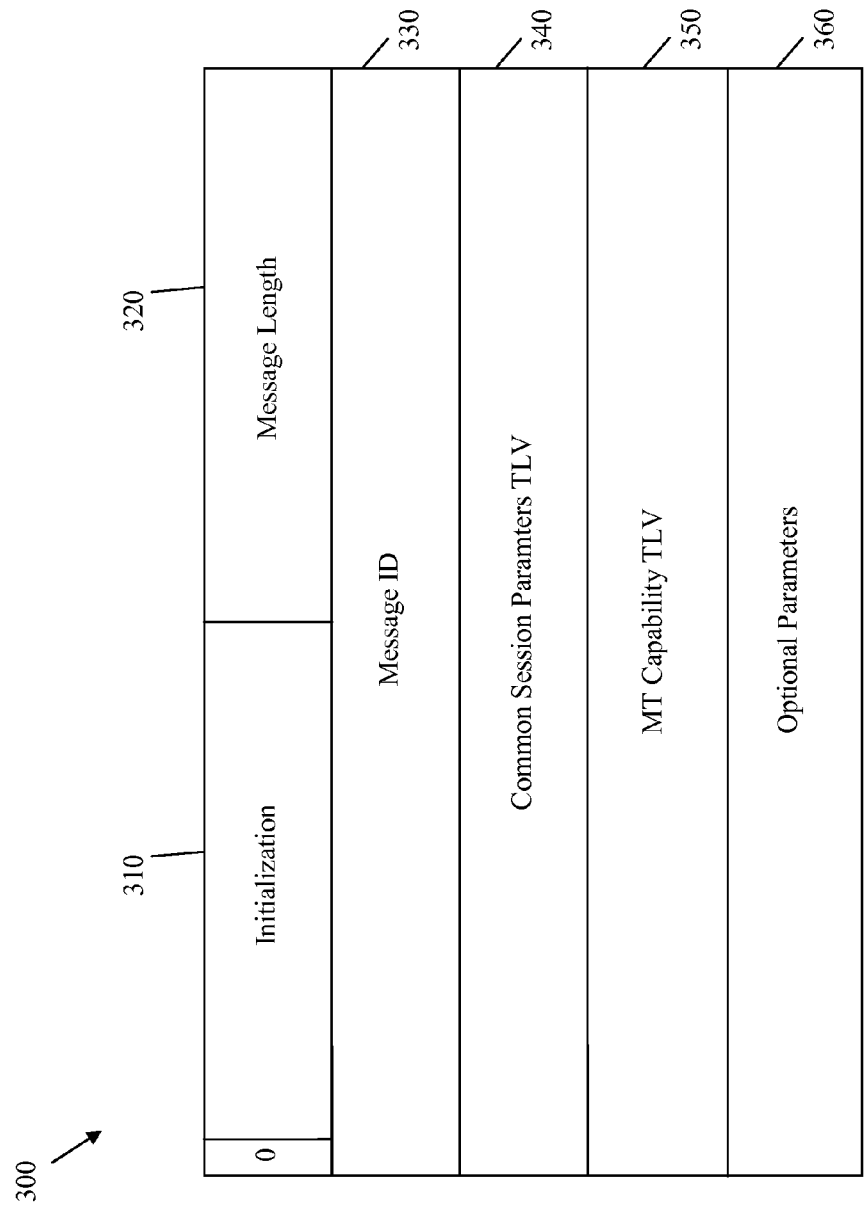
FIG. 3 is an illustration of one embodiment of a session initialization message.

FIG. 3 is an embodiment of a session initialization message 300, which may be used to initiate a session between two neighboring nodes, such as between any of the ingress node 110, transit nodes 112, or egress node 114. For instance, the session initialization message 300 may be sent to initiate MT capability negotiation, or topology mapping exchange.

The session initialization message 300 may comprise an initialization header 310, a message length 320, a message ID 330, a common session parameters TLV 340, and a MT capability TLV 350. Additionally, the session initialization message 300 may comprise other optional parameters 360. In an embodiment, the initialization header 310 may have a length of about 15 bits, the message length 320 may have a length of about 16 bits, and the message ID 330 may have a length of about 32 bits.

In an embodiment, the initialization header 310 may be assigned a specific type value (e.g., 0x0200) to indicate an initialization session message, the message length 320 may specify the length of the session initialization message 300 in bits or bytes, and the message ID 330 may indicate a unique ID associated with the session initialization message 300. Additionally, the common session parameters TLV 340 may specify information related to establish the session between two neighboring nodes and the MT capability TLV 350 may specify MT capability related information, as described in detail below.

Figure 4:
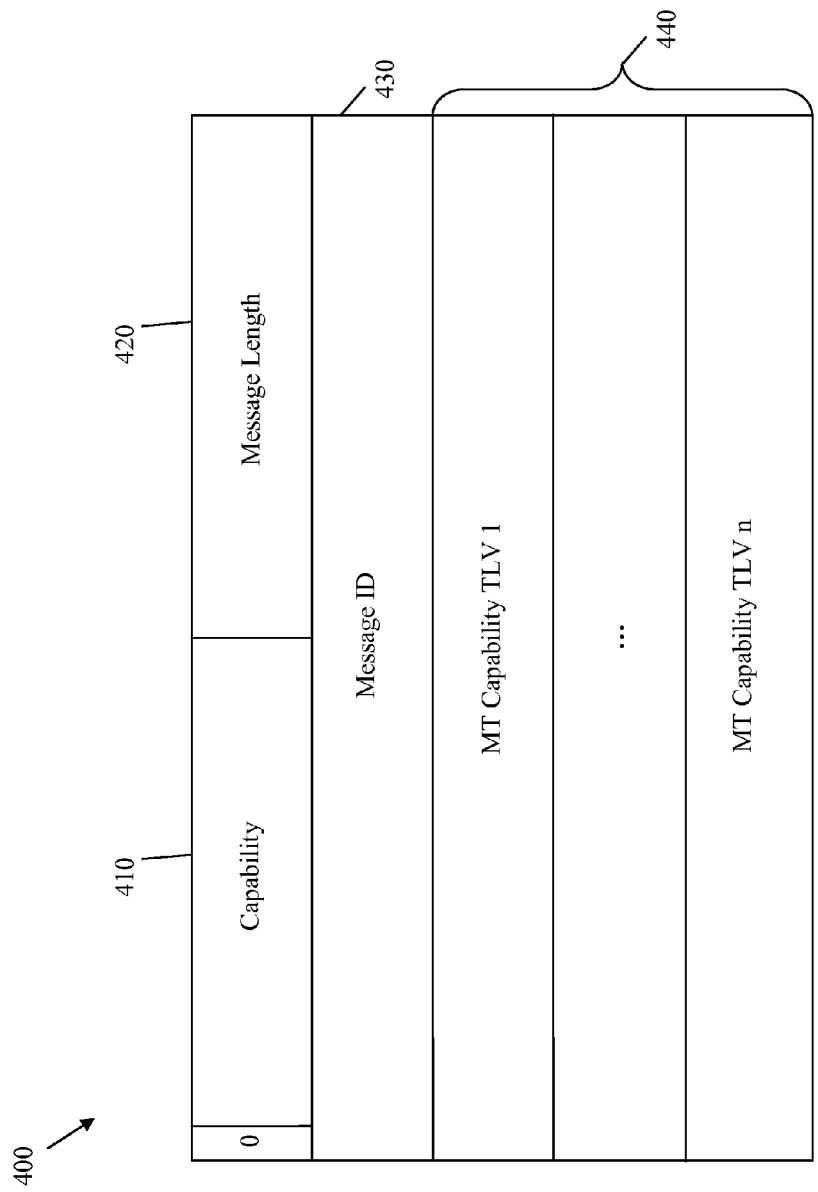
FIG. 4 is an illustration of one embodiment of a capability message.

FIG. 4 is an embodiment of a capability message 400, which may be used to indicate the capability for supporting MT in MPLS networks, for example after a session initialization between two nodes. The capability message 400 may comprise a capability header 410, a message length 420, a message ID 430, and at least one MT capability TLV 440. The capability header 410, which may have a length equal to about 15 bits, may be assigned a specific type value to indicate a capability message. The remaining fields of the capability message 400 may be substantially similar to the corresponding fields of the session initialization message 300.

Figure 5:
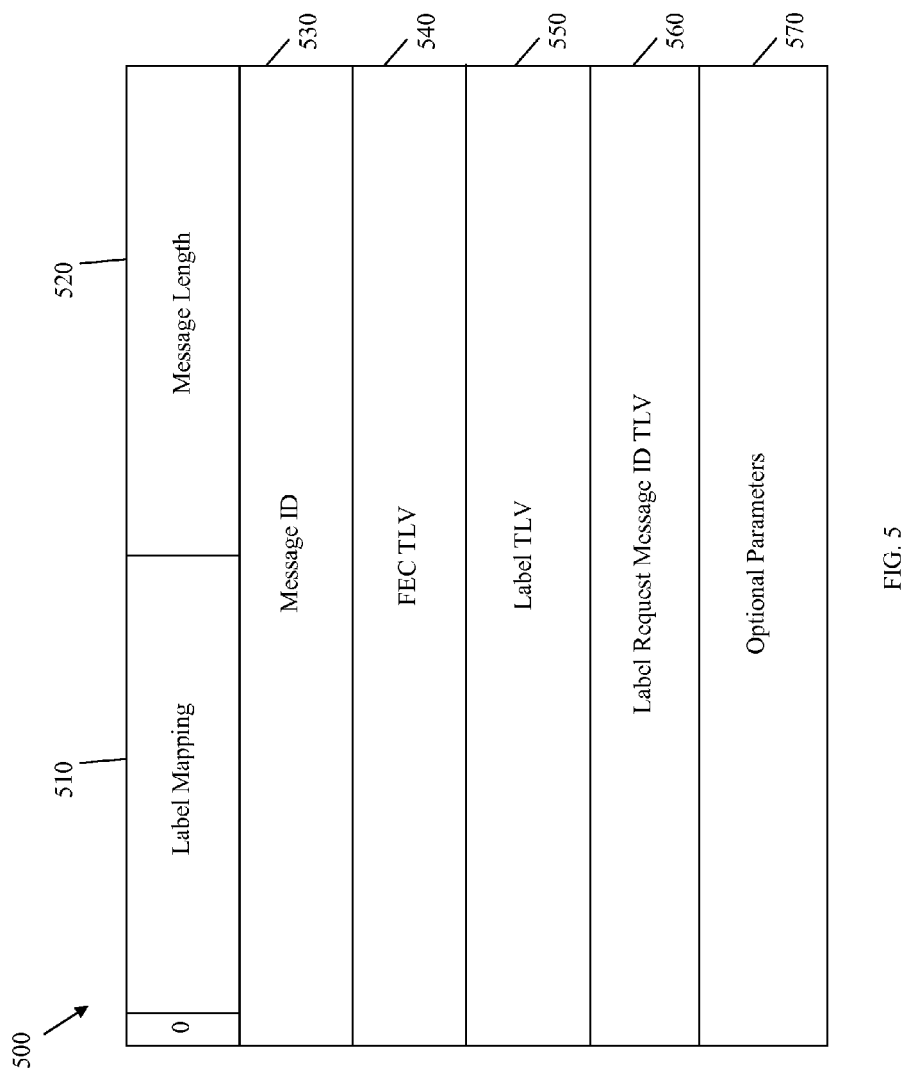
FIG. 5 is an illustration of one embodiment of a label mapping message.

FIG. 5 is an embodiment of a label mapping message 500, which may be used to send topology or label mapping information between two neighboring nodes. The label mapping message 500 may comprise a label mapping header 510, a message length 520, a message ID 530, a FEC TLV 540, a label TLV 550, and a label request message ID TLV 560. Additionally, the label mapping message 500 may comprise other optional parameters 570. In an embodiment, the label mapping header 510 may have a length of about 15 bits, the message length 520 may have a length of about 16 bits, and the message ID 530 may have a length of about 32 bits.

In an embodiment, the label mapping header 510 may be assigned a specific type value (e.g., 0x0400) to indicate a label mapping message, the message length 520 may specify the length of the label mapping message 500 in bits or bytes, and the message ID 530 may indicate a unique ID associated with the label mapping message 500. Additionally, the FEC TLV 540 may specify the FECs that correspond to one network topology, the label TLV 550 may specify the next hop labels or the inner labels associated with the FEC TLV 540, and the label request message ID TLV may specify the message ID of a label request message to which the label mapping message responds or relates. The label request message ID TLV may be replaced with MT-ID TLV.

Figure 6:
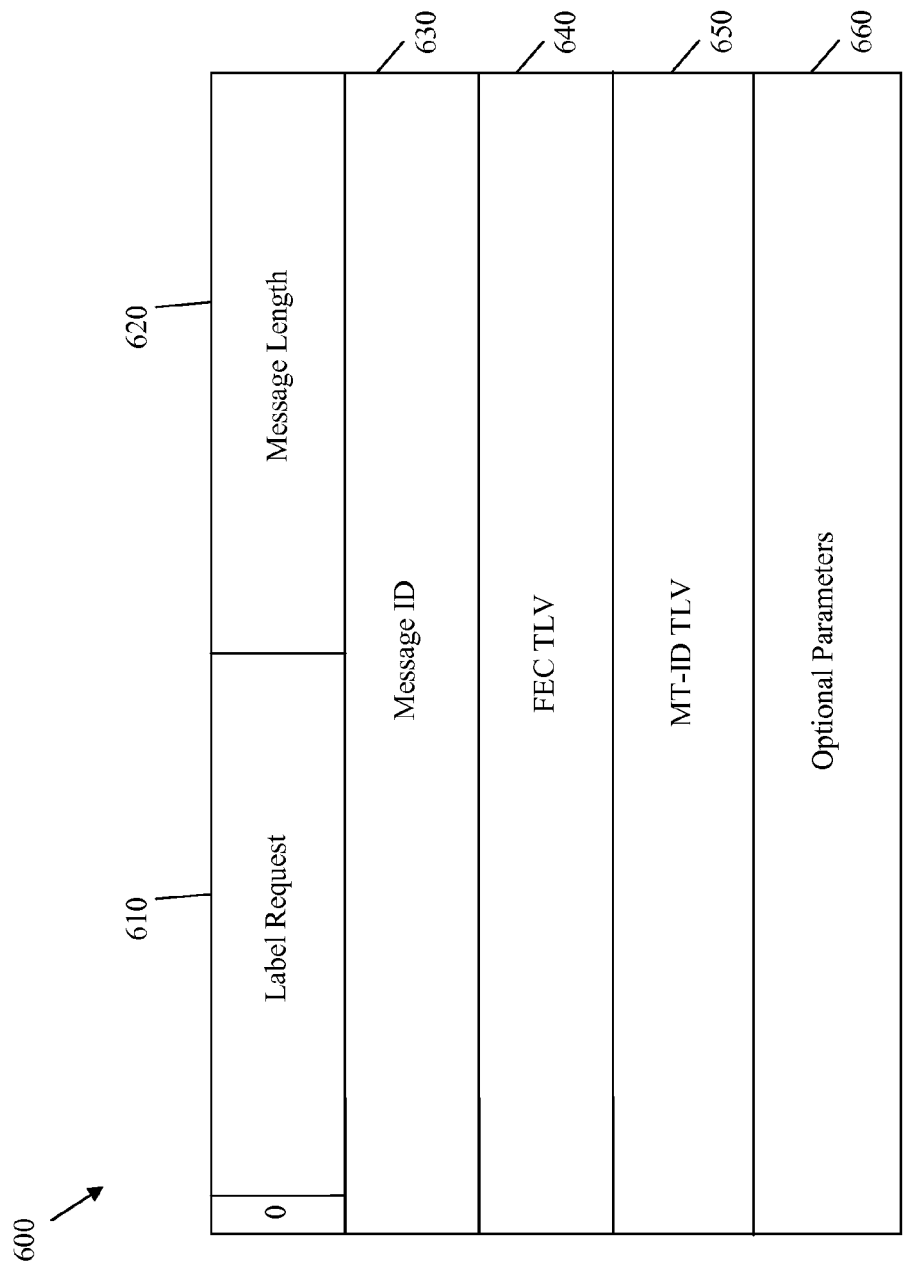
FIG. 6 is an illustration of one embodiment of a label request message.

FIG. 6 is an embodiment of a label request message 600, which may be used to request topology or label mapping from a neighboring node. The label request message 600 may comprise a label request header 610, a message length 620, a message ID 630, a FEC TLV 640, and a MT-ID TLV 650. Additionally, the label request message 600 may comprise other optional parameters 660. In an embodiment, the label request header 610, which may have a length equal to about 15 bits, may be assigned a specific type value (e.g., 0x0401) to indicate a label request message. The remaining fields of the label request message 600 may be substantially similar to the corresponding fields of the label mapping message 500.

Figure 7:
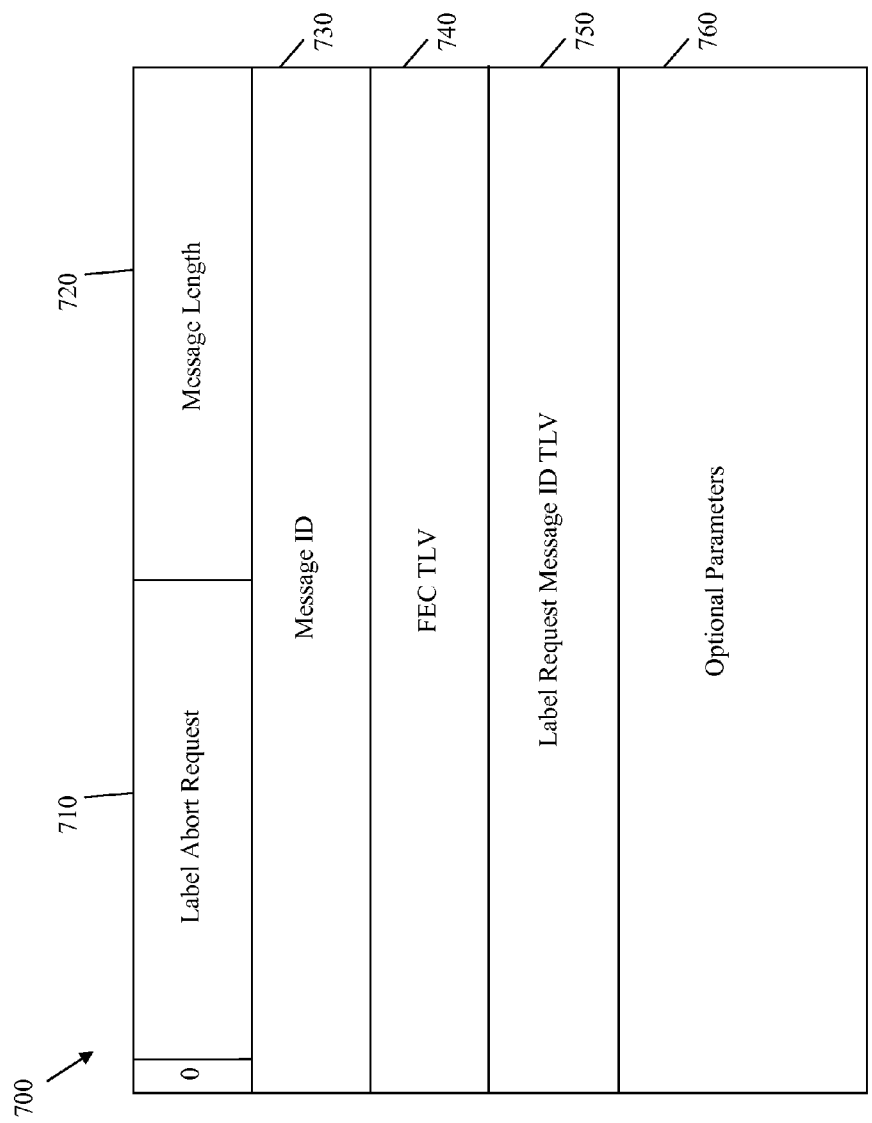
FIG. 7 is an illustration of one embodiment of a label abort request message.

FIG. 7 is an embodiment of a label abort request message 700, which may be used to abort a topology or label mapping request transmitted to a neighboring node. The label abort message 700 may comprise a label abort request header 710, a message length 720, a message ID 730, a FEC TLV 740, and a label request message ID TLV 750. Additionally, the label abort request message 700 may comprise other optional parameters 760. The label abort request header 710, which may have a length equal to about 15 bits, may be assigned a specific type value (e.g., 0x0404) to indicate a label abort request message. The label request message ID TLV 750 may specify the message ID of the transmitted label request message to be aborted. The remaining fields of the label abort request message 700 may be substantially similar to the corresponding fields of the label mapping message 500.

Figure 8:
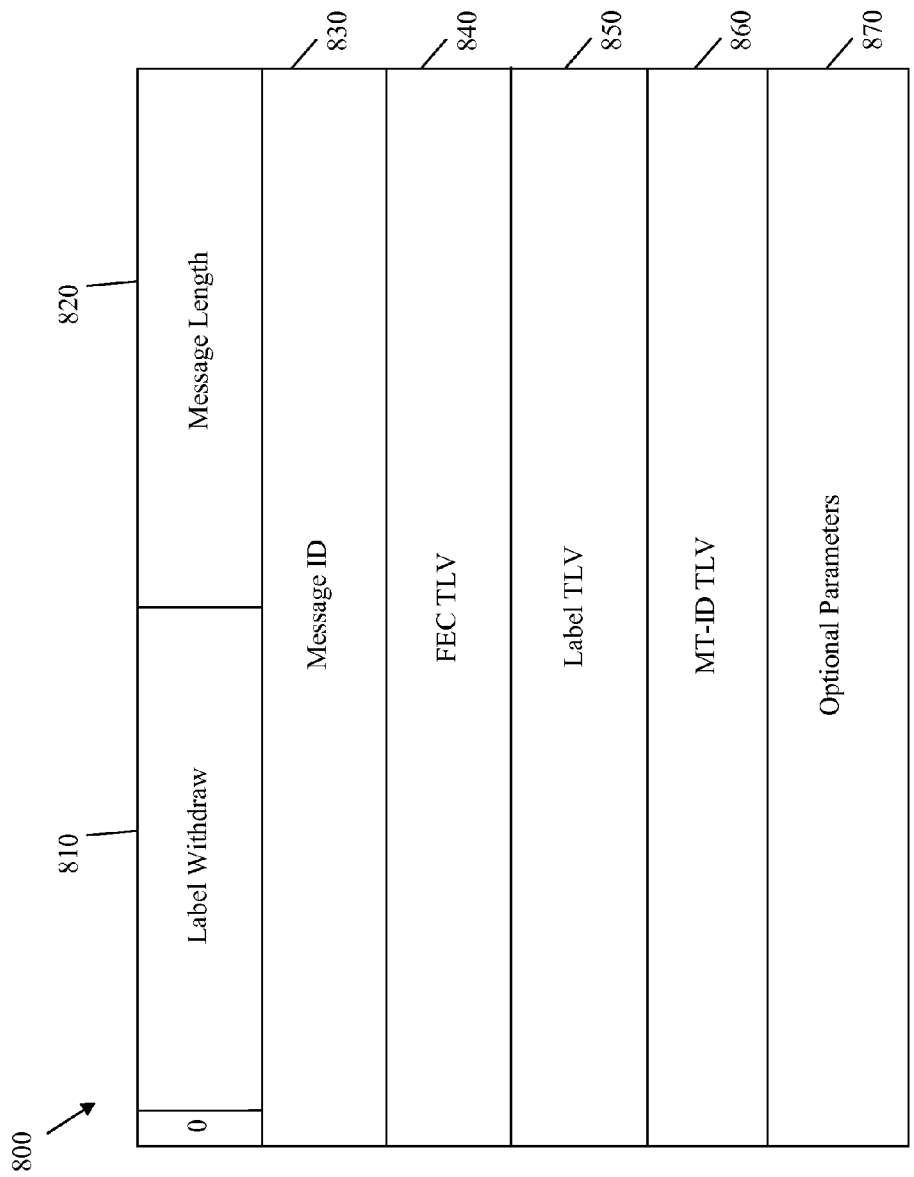
FIG. 8 is an illustration of one embodiment of a label withdraw message.

FIG. 8 is an embodiment of a label withdraw message 800, which may be used to withdraw previously advertised label mapping information or other mapping information. The label withdraw message 800 may comprise a label withdraw header 810, a message length 820, a message ID 830, a FEC TLV 840, and a MT-ID TLV 860. Additionally, the label withdraw message 800 may comprise an optional label TLV 850 and/or other optional parameters 870. The label withdraw header 810, which may have a length equal to about 15 bits, may be assigned a specific type value (e.g., 0x0402) to indicate a label withdraw message. The remaining fields of the label withdraw message 800 may be substantially similar to the corresponding fields of the label mapping message 500.

Figure 9:
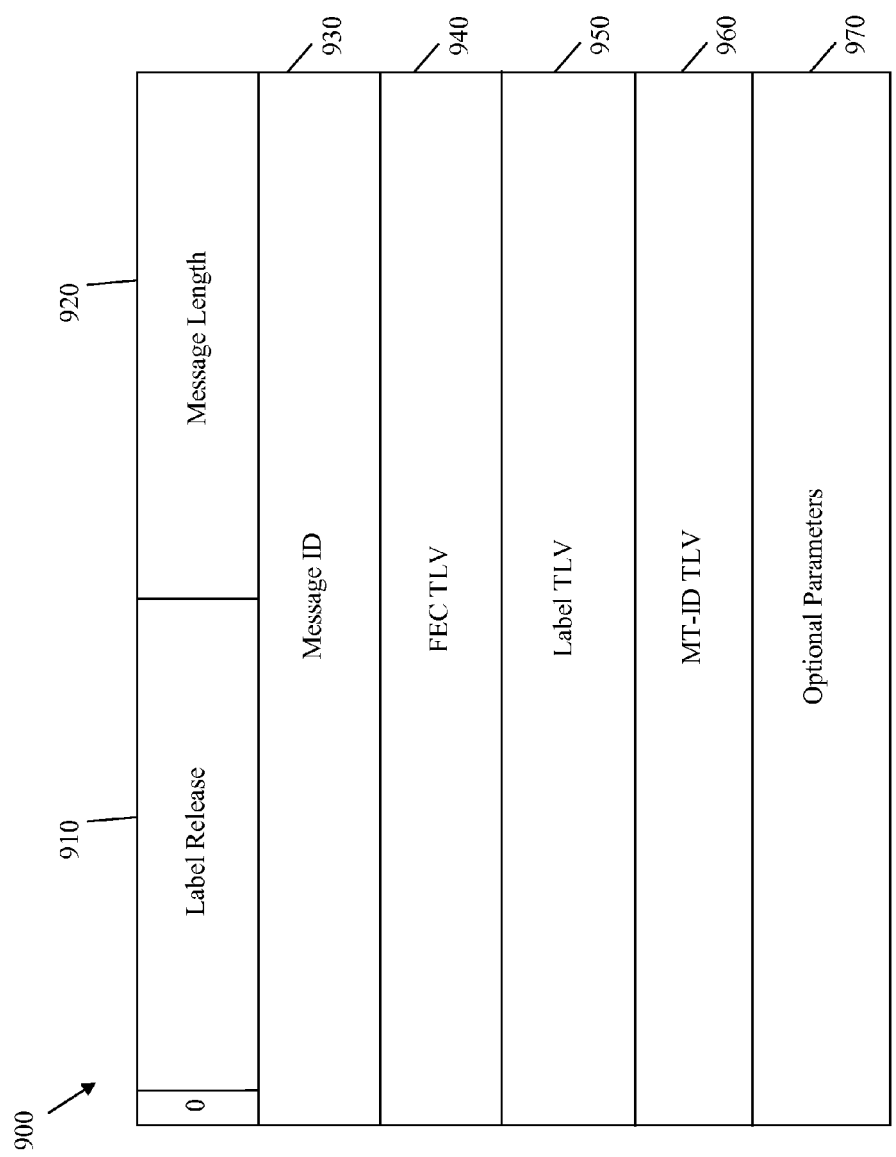
FIG. 9 is an illustration of one embodiment of a label release message.

FIG. 9 is an embodiment of a label release message 900, which may be used to release the previously requested label mapping information or other mapping information. The label release message 900 may comprise a label release header 910, a message length 920, a message ID 930, a FEC TLV 940, and a MT-ID TLV 960. Additionally, the label release message 900 may comprise an optional label TLV 950 and/or other optional parameters 970. The label release header 910, which may have a length equal to about 15 bits, may be assigned a specific type value (e.g., 0x0403) to indicate a label release message. The remaining fields of the label release message 900 may be substantially similar to the corresponding fields of the label mapping message 500.

Figure 10:
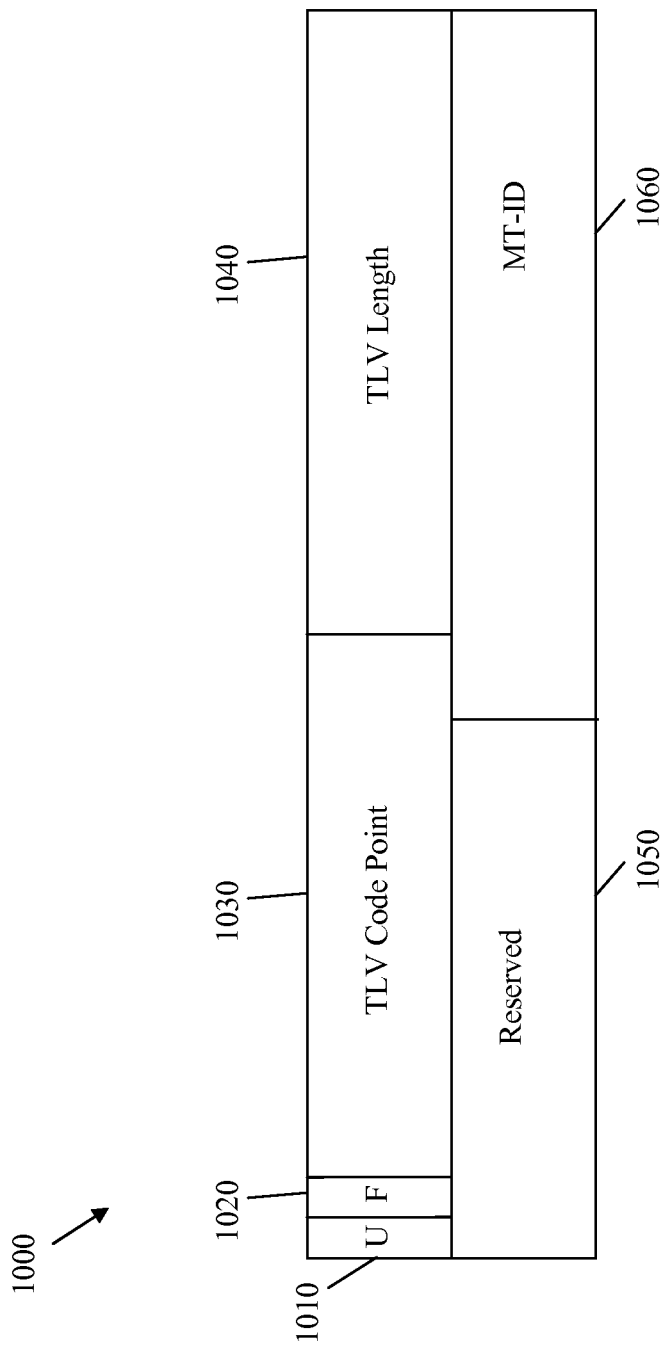
FIG. 10 is an illustration of one embodiment of a MT-ID type length value (TLV).

FIG. 10 is an embodiment of a MT-ID TLV 1000, which may be sent between two neighboring nodes, for example using the label request message 600, the label withdraw message 800, or the label release message 900. The MT-ID TLV 1000 may comprise an unknown (U) bit 1010, a forward unknown (F) bit 1020, a TLV code point 1030, a TLV length 1040, a reserved field 1050, and a MT-ID 1060. In an embodiment, the U bit 1010 and the F bit 1020 may each have a length of about one bit, the TLV code point 1030 may have a length of about 14 bits, the TLV length 1040 may have a length of about 16 bits, the reserved field 1050 may have a length of about 12 bits, and the MT-ID 1060 may have a length of about 20 bits.

In an embodiment, the U bit 1010 may be used to indicate how to respond to an unknown received TLV. For instance, if a node receives a message comprising an unknown TLV and the U bit 1010 in the MT-ID TLV 1000 is set, the node may ignore the unknown TLV and process the remaining message content. Alternatively, if the node receives a message comprising an unknown TLV and the U bit 1010 is not set or cleared, the node may ignore the entire message content and/or return the message back to the sending node. The F bit 1020 may be used to indicate whether to forward an unknown received TLV. For instance, if a first node receives from a second node a message comprising an unknown TLV and the F bit 1020 in the MT-ID TLV 1000 is set, the first node may forward the message with the unknown TLV to a third node. Alternatively, if the first node receives from the second node a message comprising an unknown TLV and the F bit 1020 is not set or cleared, the first node may forward the message without the unknown TLV to the third node. Further, the TLV code point 1030 may be assigned a specific type value to indicate a MT-ID TLV, the TLV length 1040 may specify the length of the MT-ID TLV 1000 in bits or bytes, and the reserved field 1050 may not be used or may be reserved for other purposes. The MT-ID 1060 may comprise the MT-ID or topology label assigned to the network topology, for instance from the topology-to-label table. In an embodiment, the MT-ID 1060 may be set equal to about zero to indicate a default topology in the network.

Figure 11:
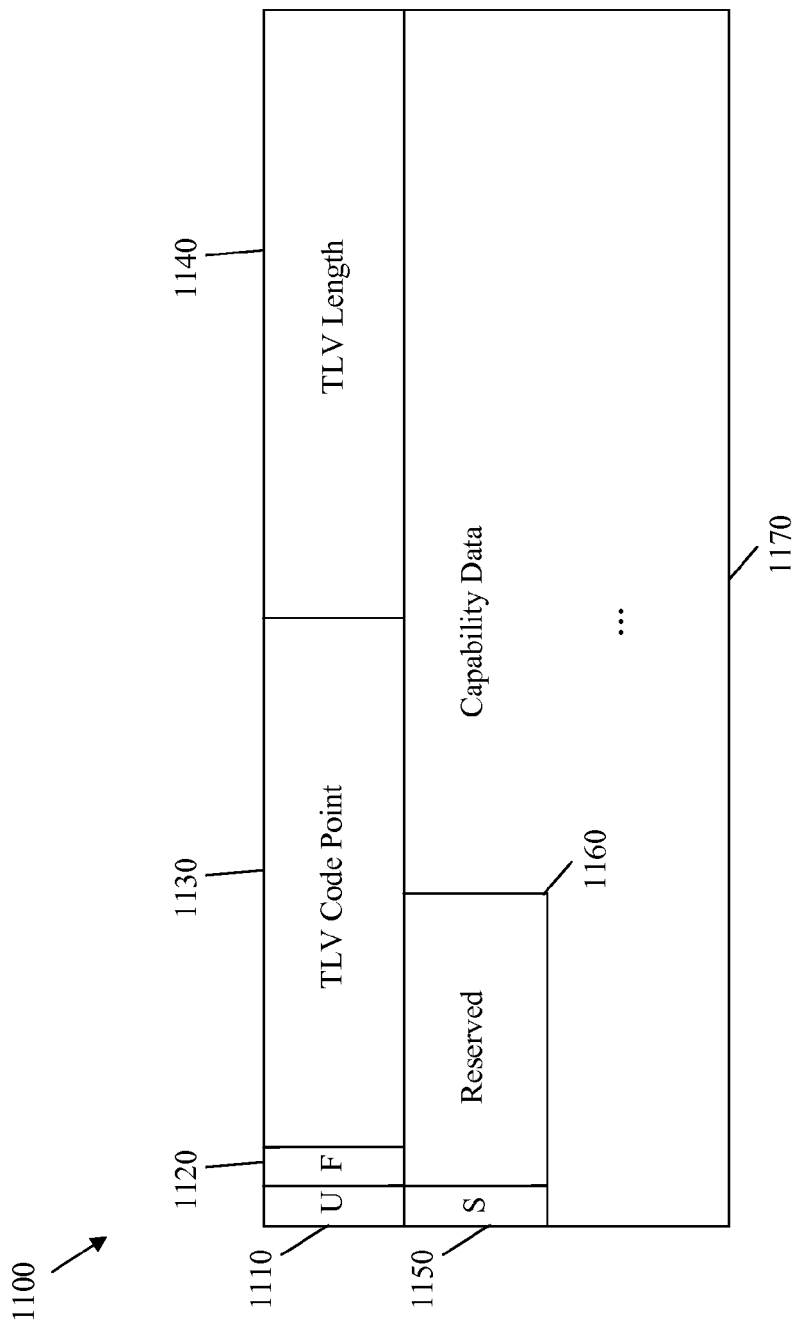
FIG. 11 is an illustration of one embodiment of a MT capability TLV.

FIG. 11 is an embodiment of a MT capability TLV 1100, which may be sent between two neighboring nodes to specify MT capability related information, for example using the session initialization message 300 or the capability message 400. The MT capability TLV 1100 may comprise a U bit 1110, an F bit 1120, a TLV code point 1130, a TLV length 1140, a state (S) bit 1150, a reserved field 1160, and a capability data portion 1170. In an embodiment, the S bit 1150 may have a length of about one bit and the reserved field 1160 may have a length of about seven bits.

The TLV code point 1130 may indicate the node's MT support capability, for example the ability to store mapping tables or exchange such information with other nodes. The S bit 1150 may be used to indicate whether the sending node is advertising or withdrawing the MT support capability for a network topology, for example when the node joins or leaves the network topology. In an embodiment, the S bit 1150 may be set to advertise the capability specified by the TLV code point 1130, or may be cleared to withdraw the capability specified by the TLV code point 1130. The capability data portion 1170 may comprise additional information about the node's capability to support MT in the MPLS network. The remaining fields of the MT capability TLV 1100 may be substantially similar to the corresponding fields of the MT-ID TLV 1000.

Figure 12:
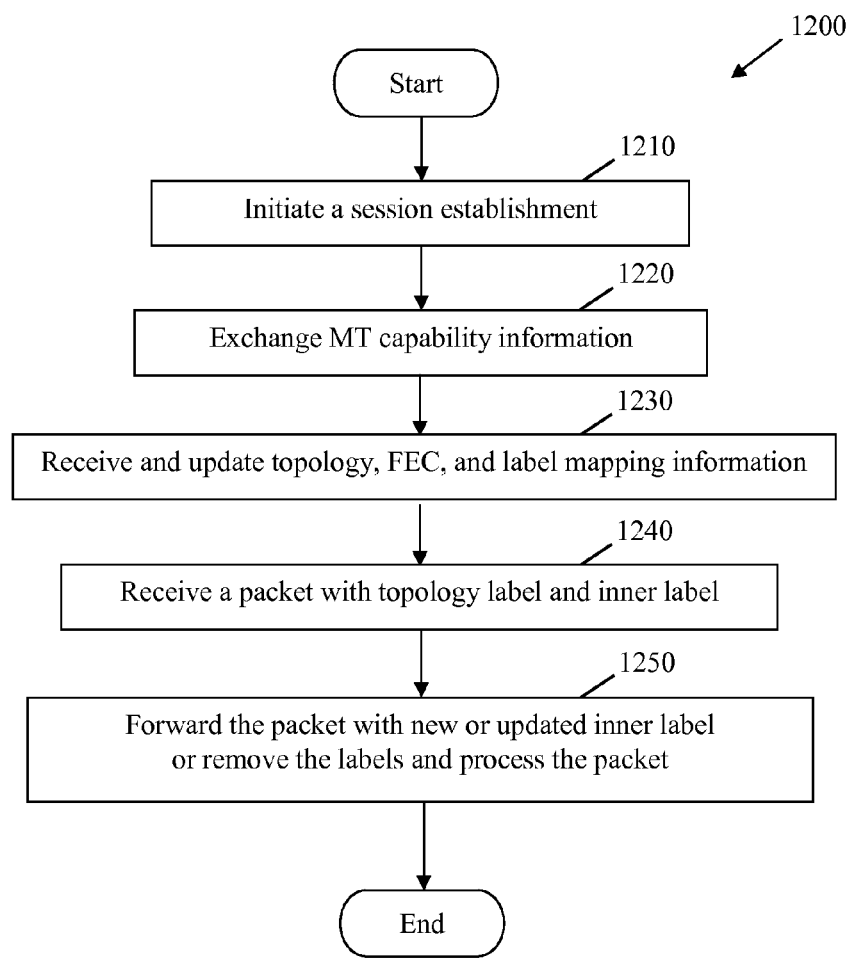
FIG. 12 is a flowchart of an embodiment of a MT MPLS method.

FIG. 12 illustrates one embodiment of a MT MPLS method 1200, which may be used to route a packet along a path in the network, for example from an ingress or first transit node to an egress or second transit node. Specifically, the packet may be routed using a topology label at the top of the packet and an inner label that indicates the next hop. Further at each hop the packet's inner label may be updated according to the topology, FEC, and label information.

The MT MPLS method 1200 may begin at block 1210, where a node (e.g., ingress, transit, or egress node) may initiate a session establishment with at least some neighboring nodes, for example when the node enters or registers with a network topology. The session establishment may be initiated by exchanging session initialization messages, such as the session initialization message 300, with the neighboring nodes. At block 1220 the node may negotiate its MT capability or exchange MT capability information with the neighboring nodes, for example during session initialization. Alternatively, the node may exchange such information after session establishment, for example by exchanging capability messages, such as the capability message 400, with the neighboring nodes. At block 1230, the node may receive and update topology, FEC, and label information from the neighboring nodes, such as the topology-to-label mapping table information, FEC-to-NHLFE mapping table information, incoming label mapping table information, or combinations thereof. In some embodiments, the node may request such information first, for example using label request messages, such as the label request message 600. The node may then update its local information or mapping tables. At block 1240, the node may receive a packet, for example from an ingress or transit node or from an external network. At block 1250, the node may be an ingress node that adds a topology label or MT-ID to the top of the packet and a new inner label. The node may be a transit node that replaces or updates the inner node using the information in the updated mapping tables without changing the top topology label. The node may then forward the packet to the next hop. Alternatively, the node may be an egress node that removes the labels from the packet and process the packet, for example based on the updated topology and FEC information.

Figure 13:
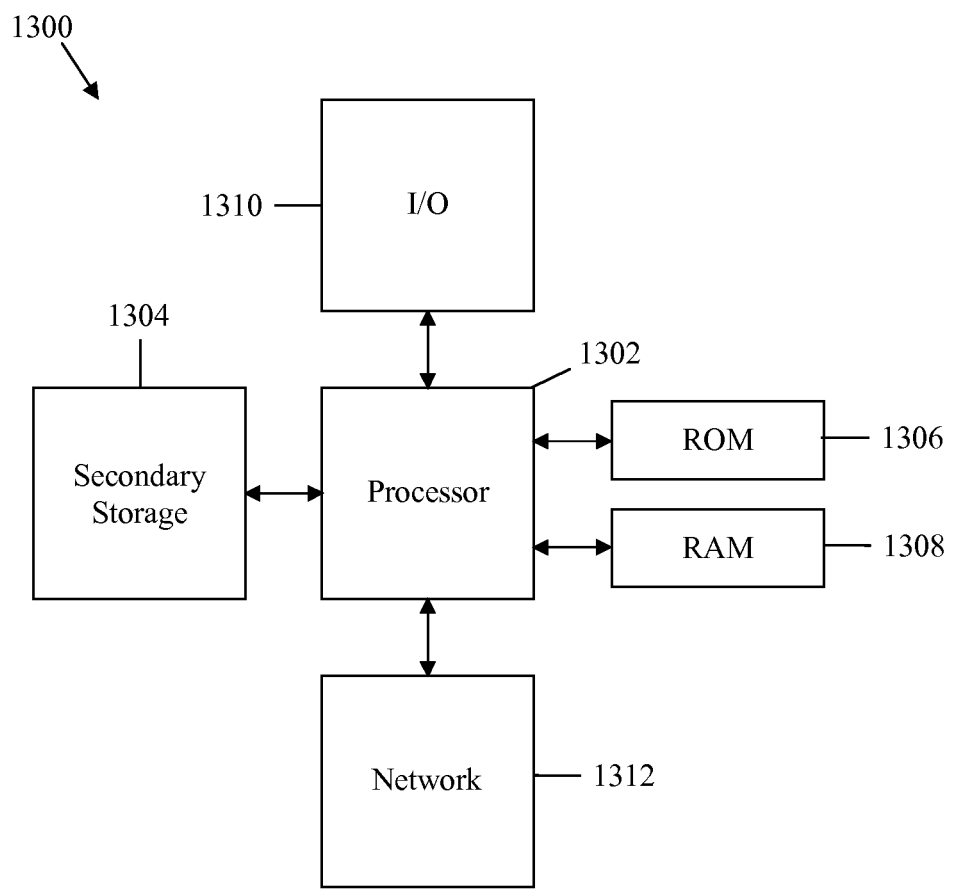
FIG. 13 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 13 illustrates a typical, general-purpose network component 1300 suitable for implementing one or more embodiments of the components disclosed herein. The network component 1300 includes a processor 1302 (which may be referred to as a central processor unit or CPU) that is in communication with memory devices including secondary storage 1304, read only memory (ROM) 1306, random access memory (RAM) 1308, input/output (I/O) devices 1310, and network connectivity devices 1312. The processor 1302 may be implemented as one or more CPU chips, or may be part of one or more application specific integrated circuits (ASICs).

The secondary storage 1304 is typically comprised of one or more disk drives or erasable programmable ROM (EPROM) and is used for non-volatile storage of data. Secondary storage 1304 may be used to store programs that are loaded into RAM 1308 when such programs are selected for execution. The ROM 1306 is used to store instructions and perhaps data that are read during program execution. ROM 1306 is a non-volatile memory device that typically has a small memory capacity relative to the larger memory capacity of secondary storage 1304. The RAM 1308 is used to store volatile data and perhaps to store instructions. Access to both ROM 1306 and RAM 1308 is typically faster than to secondary storage 1304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   a receiver configured to receive a packet;
   at least one processor coupled to the receiver and configured to:
      maintain a topology to label mapping table comprising a plurality of topology labels each identifying an associated one of a plurality of network topologies;
      determine through classification of the packet a first of the network topologies corresponding to the packet;
      determine through classification of the packet a forwarding equivalence class (FEC) corresponding to the packet and corresponding to the first network topology;
      attach to the packet a first of the topology labels from the topology to label mapping table that identifies the first network topology corresponding to the packet, wherein the first of the topology labels is attached to the packet to support selection, at a next hop node, of an incoming label mapping table associated with the first network topology for further packet forwarding in the first network topology based solely on label information; and
      attach to the packet a next hop label identifying the next hop node for the FEC in the first network topology, wherein the next hop label is obtained from a FEC-to-next-hop-label-forwarding-entry (FEC-to-NHLFE) table; and
   a transmitter coupled to the processor and configured to forward the packet to the next hop node for the FEC in the first network topology.

2. The network component of claim 1, wherein the first topology label is encoded prior to the next hop label within the packet to enable the first topology label to be detected prior to the next hop label upon reception of the packet at the next hop node to support selection of the incoming label mapping table associated with the first topology by the next hop node, wherein the at least one processor is further configured to assign the topology label for two or more nodes in the first network topology, wherein the next hop node is positioned along a label switch path (LSP), and wherein the first topology label is from a label switching protocol.

3. The network component of claim 1, wherein the at least one processor is further configured to:
   initiate a session between a plurality of nodes;
   negotiate a multi-topology (MT) capability between one or more of the nodes; and
   exchange topology information or label mapping information with at least one of the nodes,
   wherein the topology information or label mapping information comprises the first topology label, and
   wherein the MT capability indicates the network component's capability in routing data traffic amongst multiple network topologies.

4. The network component of claim 3, wherein the session is initiated using an initialization session establishment message comprising a first MT capability type length value (TLV), an initialization message header, an initialization message length field, an initialization message Identification (ID) field, and a common session parameters TLV, and wherein the MT capability is negotiated using the first MT capability TLV.

5. The network component of claim 4, wherein the MT capability for the session is negotiated using a capability message comprising a capability header, a capability message length, a capability message identification (ID) field, and a second MT capability type length value (TLV).

6. The network component of claim 5, wherein the first MT capability TLV is contained within an initialization session establishment message, and wherein both the first MT capability TLV and the second MT capability TLV comprise an unknown (U) bit, a forward unknown (F) bit, a TLV code point, a TLV length, a state (S) bit, and a capability data portion.

7. The network component of claim 3, wherein exchanging the topology information or label mapping information comprises requesting the topology information or label mapping information by transmitting a label request message comprising a label request header, a label request message identification (ID), and a FEC type length value (TLV).

8. The network component of claim 7, wherein exchanging the topology information or label mapping information further comprises receiving a label mapping message comprising the topology information or the label mapping information, wherein the label mapping message further comprises a label mapping header, a label mapping message length, a label mapping message ID, the FEC TLV, a label TLV, and a first label request message ID TLV.

9. The network component of claim 8, wherein exchanging the topology information or label mapping information further comprises:
   determining whether the first label request message ID TLV comprises the label request message ID;
   processing the label mapping message based upon the determination that the first label request message ID TLV comprises the label request message ID, wherein processing the label mapping message includes storing the topology information in a memory; and ignoring the label mapping message based upon the determination that the first request message ID TLV does not comprise the label request message ID.

10. The network component of claim 9, wherein exchanging the topology information or label mapping information further comprises:
receiving a label withdraw message comprising a label withdraw header, a label withdraw message length, a label withdraw message ID, the FEC TLV, and a label mapping message ID TLV;
determining whether the label mapping message ID TLV comprises the label mapping message ID;
processing the label withdraw message when the label mapping message ID TLV comprises the label mapping message ID; and
ignoring the label withdraw message when the label mapping message ID TLV does not comprise the label mapping message ID,
and
wherein processing the label withdraw message includes removing the topology information or the label mapping information from the memory.

11. The network component of claim 7, wherein exchanging the topology information or label mapping information further comprises aborting the request for the topology information or label mapping information by transmitting a label abort message comprising a label abort request header, a label abort message length, a label abort message ID, the FEC TLV, and a label request message ID TLV, wherein the label request message ID TLV comprises the label request message ID.

12. In a network component, a method comprising:
maintaining a topology to label mapping table comprising a plurality of topology labels each identifying an associated one of a plurality of network topologies;
receiving a packet;
determining through classification of the packet a first of the network topologies corresponding to the packet;
determining through classification of the packet a forwarding equivalence class (FEC) corresponding to the packet and corresponding to the first network topology;
attaching to the packet a first of the topology labels from the topology to label mapping table that identifies the first network topology corresponding to the packet, wherein the first of the topology labels is attached to the packet to support selection, at a next hop node, of an incoming label mapping table associated with the first network topology for further packet forwarding in the first network topology based solely on label information;
attaching to the packet a next hop label, the next hop label identifying the next hop node for the FEC in the first network topology, wherein the next hop label is obtained from a FEC-to-next-hop-label-forwarding-entry (FEC-to-NHLFE) table;
exchanging the first topology label with at least one node; and
forwarding the packet to the next hop node for the FEC in the first network topology.

13. The method of claim 12, further comprising assigning the first topology label for two or more nodes associated with the first network topology, wherein the first topology label is encoded prior to the next hop label to enable the first topology label to be detected prior to the next hop label upon reception of the packet at the next hop node to support selection of the incoming label mapping table associated with the first network topology by the next hop node, wherein the next hop node is positioned along a label switch path (LSP), and wherein the first topology label is a Multiprotocol Label Switching (MPLS) label that uniquely identifies the first network topology.

14. The method of claim 12, further comprising:
initiating a session between a plurality of nodes;
negotiating multi-topology (MT) capability between the nodes; and
exchanging topology information or label mapping information with at least one of the nodes,
wherein the MT capability indicates the network component's capability in routing data traffic amongst multiple network topologies.

15. The method of claim 14, wherein the session is initiated using an initialization session establishment message comprising a first MT capability type length value (TLV), an initialization message header, an initialization message length field, an initialization message Identification (ID) field, and a common session parameters TLV, wherein the MT capability for the session is negotiated using the first MT capability TLV.

16. The method of claim 15, wherein the MT capability is negotiated using a capability message comprising a capability header, a capability message length, a capability message ID field, and a second MT capability TLV.

17. The method of claim 16, wherein the first MT capability TLV is contained within an initialization session establishment message, and wherein both the first MT capability TLV and the second MT capability TLV comprise an unknown (U) bit, a forward unknown (F) bit, a TLV code point, a TLV length, a state (S) bit, and a capability data portion.

18. The method of claim 14, wherein exchanging the topology information or label mapping information comprises requesting the topology information or label mapping information by transmitting a label request message comprising a label request header, a label request message identification (ID), and a FEC TLV.

19. A computer program product comprising computer executable instructions stored on a non-transitory computer readable medium such that when executed by a processor causes a node to:
receive a packet corresponding to a first network topology amongst a plurality of network topologies;
determine through classification of the packet a network topology and a forwarding equivalence class (FEC) corresponding to the packet;
determine a first next hop label amongst a plurality of next hop labels;
add a first topology label and the first next hop label to the packet; and
forward the packet to a next hop node along a label switch path (LSP) within the network topology indicated by the first topology label,
wherein the first topology label is a label used within a label switching protocol,
wherein the first next hop label identifies the FEC and the next hop node along the LSP for the first network topology identified by the first topology label,
wherein the first topology label is the same for two or more nodes associated with the first network topology,
wherein the instructions, when executed by the processor, further cause the node to:
map each of the network topologies to each of the topology labels within a topology-to-label mapping table;
map each of the next hop labels to a forwarding equivalence class (FEC) within a first FEC-to-next-hop-label-forwarding-entry (FEC-to-NHLFE) table, wherein the first FEC-to-NHLFE table corresponds to the first network topology, and wherein a second FEC-to-NHLFE table corresponds to a second network topology amongst the plurality of network topologies.

* * * * *